US008600901B2

(12) United States Patent
Sinha

(10) Patent No.: US 8,600,901 B2
(45) Date of Patent: Dec. 3, 2013

(54) PROVIDING SOCIAL LIKENESS WITHIN A MESSAGING CONTEXT

(75) Inventor: Charu Sinha, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 587 days.

(21) Appl. No.: 12/844,697

(22) Filed: Jul. 27, 2010

(65) Prior Publication Data

US 2012/0030588 A1 Feb. 2, 2012

(51) Int. Cl.
*G06Q 99/00* (2006.01)
*G06F 3/00* (2006.01)

(52) U.S. Cl.
USPC .......... 705/319; 715/752

(58) Field of Classification Search
USPC .......... 705/319
See application file for complete search history.

(56) References Cited

U.S. PATENT DOCUMENTS 7,764,951 B2 * 7/2010 Patel et al. .......... 455/414.1
2007/0067439 A1 * 3/2007 Mason et al. .......... 709/224
2010/0161369 A1 * 6/2010 Farrell et al. .......... 705/8

OTHER PUBLICATIONS

Harsh Agrawal, Most popular Facebook application in Sep. 2009, pp. 1-6, downloaded from http://fbknol.com/most-popular-facebook-application-in-september-09/.*
Agrawal, H., "Most Popular Facebook Application in Sep. 2009," fbknol.com, Sep. 30, 2009, 6 pages http://fbknol.com/most-popular-facebook-application-in-september-09/ accessed Mar. 7, 2011.
Starr, J., "Facebook's Friend of the Day Application," associatedcontent.com, May 1, 2010, 2 pages http://www.associatedcontent.com/article/2943592/facebooks_friend_of_the_day_application.html?cat=59 accessed Mar. 7, 2011.

* cited by examiner

*Primary Examiner* — Jami A Plucinski
*Assistant Examiner* — Ehrin Pratt
(74) *Attorney, Agent, or Firm* — James J. DeCarlo

(57) ABSTRACT

Embodiments are directed towards providing a likeness application that may be integrated into one or more different messaging applications to provide a user with an indication of how much the user may be liked by their messaging contacts. Such application is directed towards providing a level of fun to a first user through a dynamically calculated social networking indicator. In one embodiment, the first user may communicate with one or more other users over a network using the messaging application modified with the likeness application. The other users may also communicate with each other over the network using the modified messaging application. Then, at various times or conditions, the likeness application may display to the first user a relative percentage indicating how much the first user is being 'liked' by one or more other users.

14 Claims, 8 Drawing Sheets

PROVIDING SOCIAL LIKENESS WITHIN A MESSAGING CONTEXT

TECHNICAL FIELD

The present invention relates generally to social networking applications and, more particularly, but not exclusively to employing a providing a messaging user to asses how much they are "liked" by one or more other users using various measures.

BACKGROUND

Today, online social networks have become the new meeting grounds. The development of such online social networks touch countless aspects of our everyday lives, providing instant access to people of similar mindsets, and enabling us to form relationships with more people in more ways than ever before. However, as people form these relationships, they may sometimes wonder about a strength of that relationship. For example, people may wonder whether the person with whom they are communicating likes them.

However, today's computing technologies not only provide a forum for people to communicate, but they also provide people with various applications to conduct work, and to play. In fact, many people seek applications that provide a 'fun factor' to the user in an interesting and reliable way. Integration of this fun factor with applications that also provide utility, such as providing an ability to communicate, increases the likelihood that the application will be reused, and used by more users. Thus, applications with such fun factor then may provide significant value, not only to the user, but also in terms of increased revenue to the application providers. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
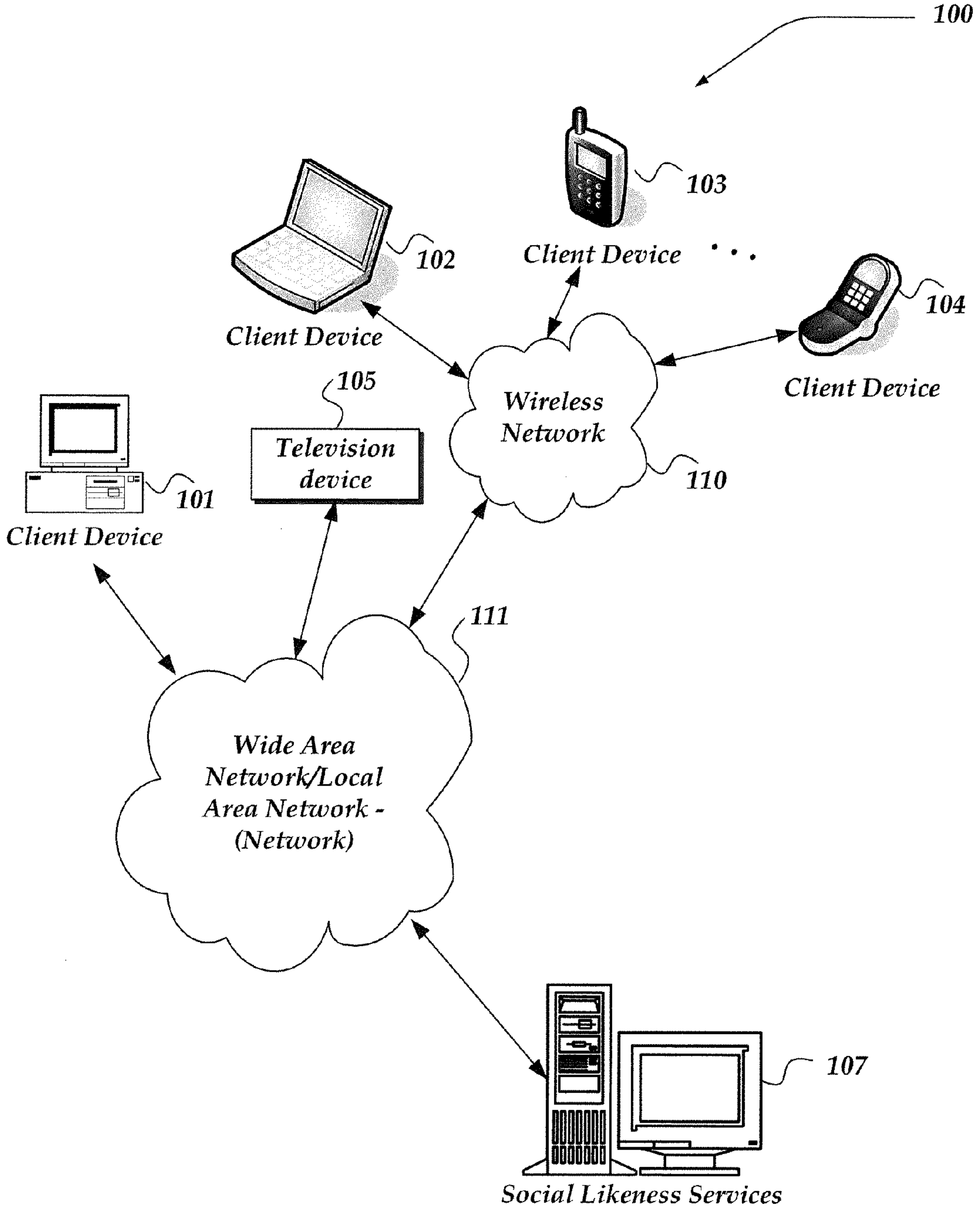
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, various embodiments may take the form of an entirely hardware embodiment, an entirely software embodiment or an embodiment combining software and hardware aspects. The following detailed description is, therefore, not to be taken in a limiting sense.

Throughout the specification and claims, the following teens take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards providing a likeness application that may be integrated into one or more different messaging applications to provide a user with an indication of how much the user may be liked by their messaging contacts. Such application is directed towards providing a level of fun to a first user through a dynamically calculated social networking indicator. In one embodiment, the first user may communicate with one or more other users over a network using the messaging application modified with the likeness application. The other users may also communicate with each other over the network using the modified messaging application. Then, at various times or conditions, the likeness application may display to the first user a relative percentage indicating how much the first user is being 'liked' by one or more other users. In one embodiment, the display may be through the messaging application. In one embodiment, a likeness percentage is determined based on an amount of time each user communicates with the first user using the messaging application as compared with an amount of time the other users communicate with users other than the first user. However, the likeness percents are not limited to be calculated on just an amount of time communicating, but other metrics may also be used. For example, in one embodiment, a number of messages communicated between the first user and another user compared to a number of messages communicated between users other than the first user may also be used to determine the likeness percents. In still another embodiment, content of messages may be analyzed to determine whether the messages provide likeness information about various users, including the first user. In one embodiment, the content may be analyzed using a Parts Of Speech (POS) analysis to identify names of users, and/or adjectives, adverbs, nouns, or the like that may indicate a likeness characteristic. Such POS information may then be combined with other information to further provide the likeness percents.

In one embodiment, based on a likeness percent exceeding an upper threshold, or being less than a lower threshold, various fun oriented suggestions, congratulatory messages, or the like, may be provided to the user. In addition, advertisements may be selected and displayed to the user based on the likeness percent with respect to at least one of the thresholds.

As described further below, the likeness percents may be determined at a server device, within a cloud architecture across one or more computing devices, and/or within a client device, such as within a peer-to-peer architecture, or even a combination of cloud and peer-to-peer architectures. However, because a variety of architectures are envisaged, the invention is not limited to a given architecture or environment.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 111, wireless network 110, client devices 101-105, and Social Likeness Services (SLS) 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client devices 101-105 may include virtually any computing device capable of communicating over a network to send and receive information, including social networking information, performing various online activities, including messaging with other client devices, or the like. The set of such devices that may be used for client device 101 include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, messaging application, and/or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 101-105 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to SLS 107, or other computing devices.

Client devices 101-105 may further be configured to include a client application that enables an end-user to log into an end-user account that may be managed by another computing device, such as SLS 107, or the like. Such end-user account, for example, may be configured to enable the end-user to manage one or more online activities, including for example, search activities, social networking activities, browse various websites, make purchases, sell products/services, communicate with other users, or the like. However, participation in such online networking activities may also be performed without logging into the end-user account.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, SLS 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of SLS 107 is described in more detail below in conjunction with FIG. 3. Briefly, however, SLS 107 may include any one or more computing devices capable of connecting to network 111 to enable client devices 101-105 to send messages between each other. In one embodiment, SLS 107 may further enable one or more users of client devices 101-105 to access and/or download a likeness application that may integrate with one or more messaging applications. In one embodiment, the likeness application is configured to enable a user to provide various user preferences to the likeness application useable to determine when and how to display a likeness percent to the user of the client device. When configured, SLS 107 may then employ one or more user preferences to calculate various likeness percentages for the user. In one embodiment, the data used for calculating the likeness percentages may be stored on the client devices 101-105; however, in another embodiment, the data may be stored at least in part on SLS 107.

SLS 107 may then, based on the user's preferences, display the likeness percentages to the client device of the user. In one embodiment, SLS 107 may further employ one or more threshold values to select various messages, such as social networking advice messages, congratulatory messages, or the like to the client device. SLS 107 may also select various advertisements for display to the client device based, at least in part, on a value of a likeness percentage. SLS 107 may employ a process such as described in more detail below in conjunction with FIG. 4 to perform at least some of these actions. Further, SLS 107 may provide various user interface displays, including those described in more detail below in conjunction with FIGS. 5-8 for managing and/or otherwise using the likeness application.

In one embodiment, the likeness application may be integrated with a messaging application, such as an instant messaging application. However, other messaging applications may also be used, including, but not limited to SMS applications, email applications, or the like.

Devices that may operate as SLS 107 include various network devices, including, but not limited to personal computers, desktop computers, multiprocessor systems, microprocessor-based or programmable consumer electronics, network PCs, server devices, network appliances, and the like. It should be noted that while SLS 107 is illustrated as a single network device, the invention is not so limited. For example, SLS 107 may also represent a plurality of various network devices residing within a cloud architecture, or similar infrastructure. Similarly, at least some of the actions performed by SLS 107 may also be performed within one or more client devices 101-104. For example, at least some of the likeness percents, data collection, or the like, may be determined using a peer-to-peer architecture, a cloud architecture, or any of a variety of other architectures. Thus, the invention is not to be construed as being limited to a single environment and other configurations, and architectures are also envisaged.

Illustrative Client Device

Figure 2:
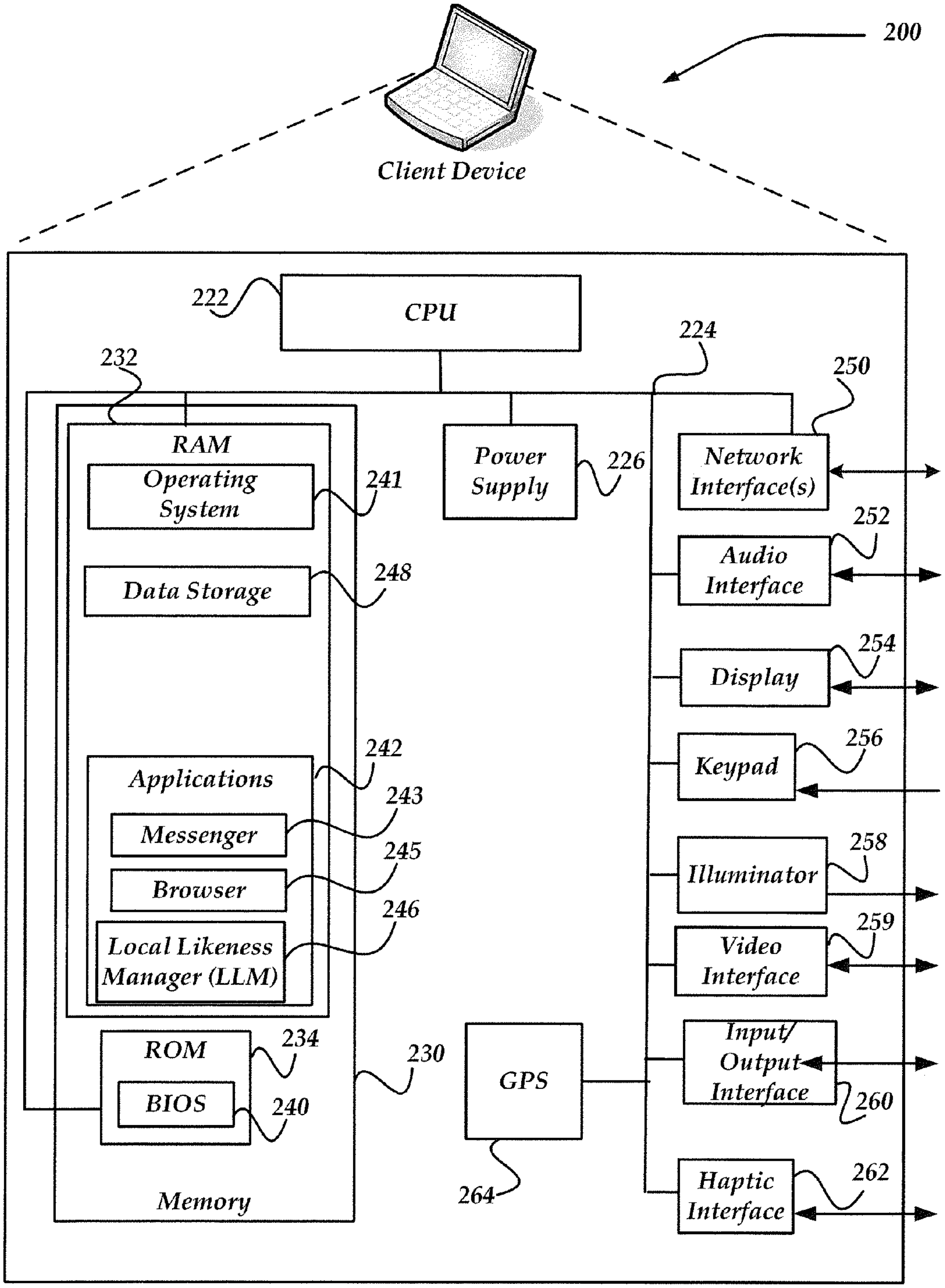
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAT, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store social networking information including address books, buddy lists, aliases, user profile information, or the like. Further, as illustrated, data storage 248 may also store information about messages, messages, data collected from one or more messages, including message duration (time) data, message count data, Parts of Speech (POS) data, or the like. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and Local Likeness Manager (LLM) 246.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed.

In one embodiment, browser 245 may be configured to enable access to a graphical user interface provided by SLS 107 of FIG. 1 and/or LLM 246. In one embodiment, the user interface may be employed by a user of client device 200 to review and/or manage user preferences, and/or other aspects of likeness data.

Messenger 243 may be configured to manage a messaging session using any of a variety of messaging communications including, but not limited to email, Short Message Service (SMS), Instant Message (IM), Multimedia Message Service (MMS), interne relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like. Further, messenger 243 may also interact with LLM 246 to enable management of likeness related activities, and/or displays.

LLM 246 represents any application that may be executed within one or more CPU 222 to enable various actions, including, managing likeness related activities, and displays. In one embodiment, LLM 246 may be a downloadable component for managing local aspects of likeness related activities. In one embodiment, LLM 246 may be an optional component, such that in another embodiment, various activities performed by LLM 246 may be performed in part or in whole by a Remote Likeness Manager (RLM) described in more detail below in conjunction with FIG. 4. Briefly, however, LLM 246 may integrate with messenger 243 and/or browser 245 to provide a user interface for managing likeness activities. For example, in one embodiment, LLM 246 might provide within a tool bar, or other location, within a user interface for messenger 245, a user selectable icon that may activate, and/or otherwise enable a user to access one or more likeness user interface display screens. Such interface display screens, including those described further below in conjunction with FIG. 5-8. For example, such display screens may enable a user to activate/deactivate likeness actions; allow a user to manage various user preferences, including identifying contacts for which the likeness data is to be based upon, frequency of display of the likeness percents, and other related user preferences. LLM 246 may, in part, or in conjunction with messenger 243 and/or an RLM, employ the process described below in conjunction with FIG. 4 to perform at least some of its actions.

Illustrative Network Device

Figure 3:
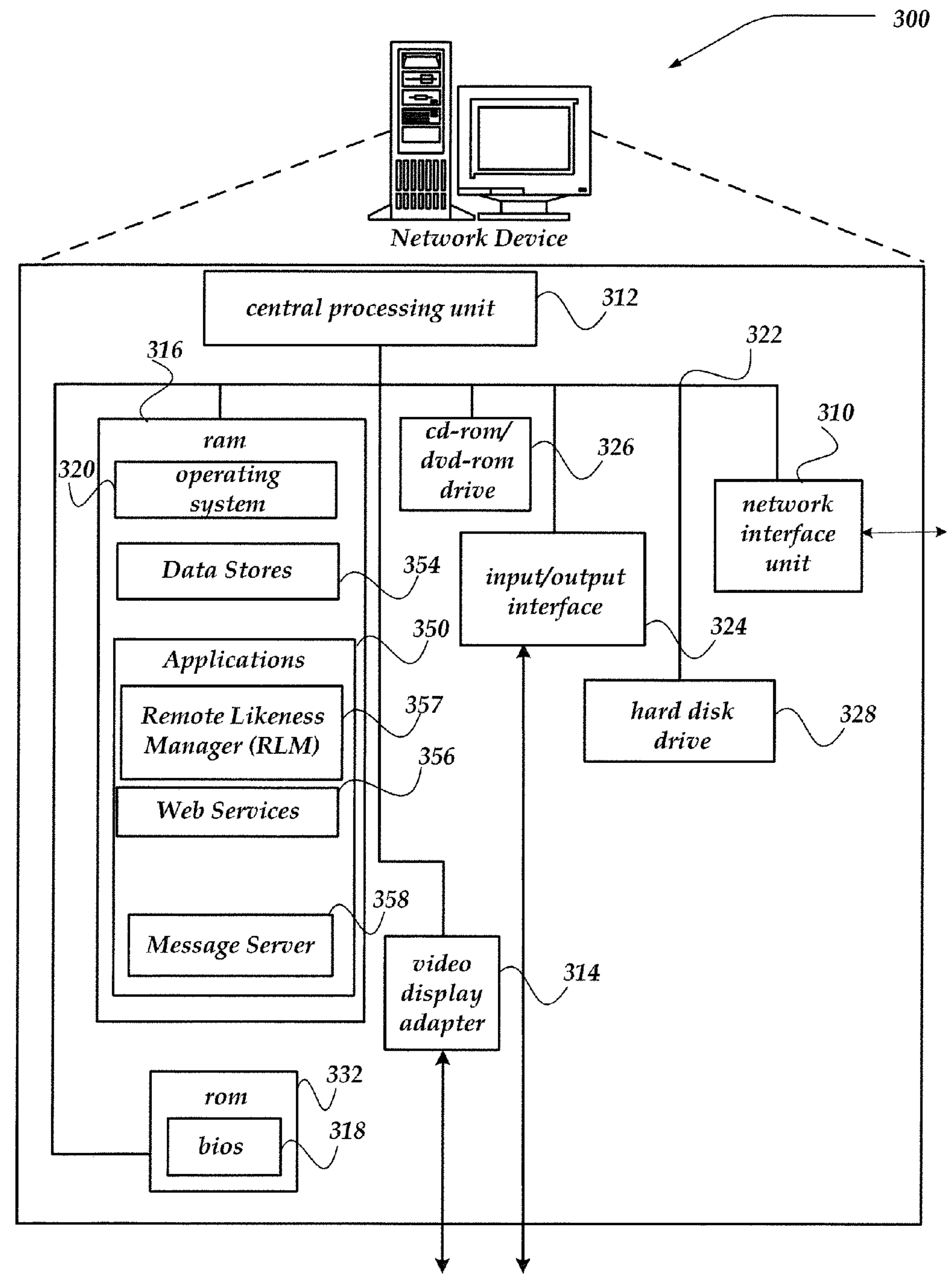
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, SLS 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable storage devices, namely computer-readable storage media or devices. Computer-readable storage media may include volatile, nonvolatile, removable, and non-removable devices implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various messages, and/or information about the messages, including, but not limited to message sender and receiver information, duration of messaging sessions, a number of messages sent between users, and/or data obtained from conducting a POS analysis on one more messages' content. In one embodiment, storage of such information may be based on a specific user, user account, profile, or the like. Thus, in one embodiment, storage of the information may be configured to provide at least some security and/or privacy constraints on the information. Data stores 354 may further include program code, data, algorithms, and the like, for use by a processor, such as central processing unit (CPU) 312 to execute and perform actions. In one embodiment, at least some of data store 354 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, and Remote Likeness Manager (RLM) 357, may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like.

Messaging server 356 may include virtually any computing component or components configured and arranged to forward messages from message user agents, and/or other message servers, or to deliver messages to a local message store, such as data store 354, or the like. Thus, messaging server 356 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, or any of a variety of other message types. In one embodiment, messaging server 356 may enable users to initiate and/or otherwise conduct chat sessions, VOIP sessions, or the like.

In one embodiment, RLM 357 is configured to provide a downloadable component, such as LLM 246 of FIG. 2 to a client device for use in managing likeness user preferences, and/or managing of likeness displays, and/or the like. In one embodiment, RLM 357 might operate independent of a local LLM to a client device. That is, in one embodiment, a client device might be configured to interact with message server 358 and/or web services 356, which in turn interact with RLM 357 to provide likeness actions to a client device.

In one embodiment, as noted elsewhere, RLM 357 (and/or LLM 246) provides user interfaces for display at a client device that enables a user to manage various user preferences. For example, in one embodiment, a user might specify one or more users from their contact lists, or the like, for which the user requests likeness percent data to be provided to the user. RLM 357 may then monitor various messaging activities between the user and one or more other user to determine various data, including, a duration of each messaging session; a count of messages; and/or even various POS analysis data. In one embodiment, such data may be obtain based on communications between a first user and one or more other users, and based on communications between the other users and not with the first user.

RLM 357 may then determine from the collected data likeness percents for the user (first user). RLM 357 further compares the determined likeness percents to various thresholds, and based on the comparisons selects various messages, advertisements, and/or the like for display to the first user along with the determined likeness percents. It is important to note, that while the above discussion refers to determining likeness percents, the invention is not so limited, and other likeness metrics may also be determined. For example, instead of, or in addition to, the likeness percents, a ratio of message durations, ratio of message counts, ratio of message likeness data based on POS analysis, or the like may determined. In one embodiment, such ratios, and/or percents may be combined to generate a combined metric. However, in another embodiment, some of the determined metrics may be separately displayed at a client device. For example, in one embodiment, such as the POS analysis, particular adjectives, nouns, adverbs, or the like, discerned from messages between two or more users other than the first user, but about the first user, might be displayed to indicate a more subjective indication of likeness. Thus, the invention is not to be construed as being constrained to a single likeness metric. In any event, RLM 357 may employ the process of FIG. 4 to perform at least some of its actions.

Generalized Operation

Figure 4:
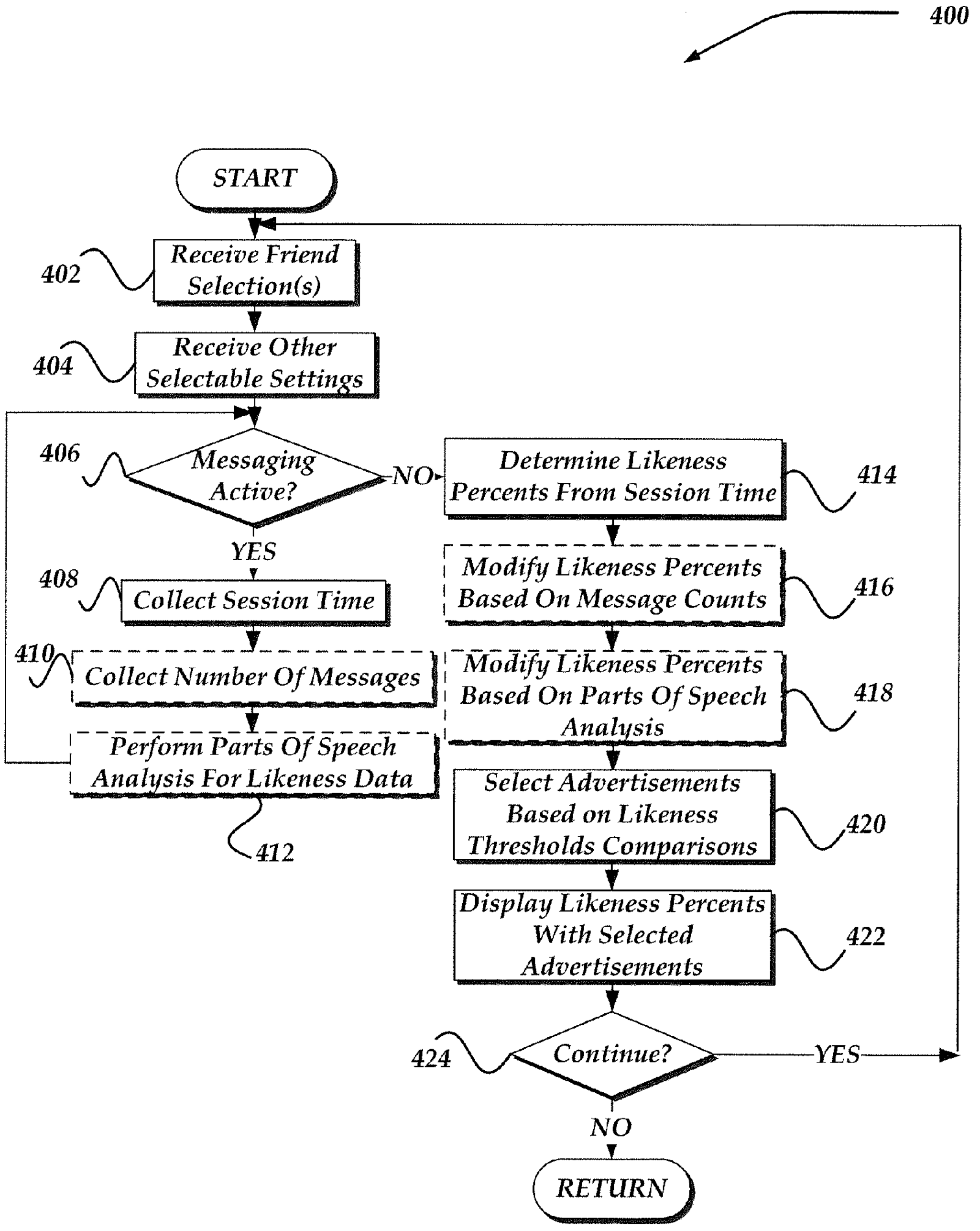
FIG. 4 illustrates a logical flow diagram generally showing one embodiment of an overview process for assessing and providing for display to a user information associated with how much the user is "liked" by one or more other users.

The operation of certain aspects of the invention will now be described with respect to FIG. 4. FIG. 4 illustrates a logical flow diagram generally showing one embodiment of an overview process for assessing and providing for display to a user information associated with how much the user is "liked" by one or more other users. As noted elsewhere, process 400 of FIG. 4 may be implemented in part, or whole, within network device 300 of FIG. 3, and/or one or more of client devices 200 of FIG. 2.

Process 400 begins, after a start block, at block 402, where a user is provided with a user interface to select and/or otherwise manage various user preferences. For example, at block 402, the user is provided at a client device, with an interface to select one or more contacts for which likeness data is to be collected. In one embodiment, the list of contacts may be obtained from a user's messaging application, and/or obtained from the user's plurality of different messaging applications. For example, if the messaging application is an IM application, then the user's IM contacts might be used. However, in another embodiment, although the messaging application is an IM application, various other messaging applications, such as SMS, email, or the like might be accessed to provide a single consolidated display of contacts from which the user might select.

In one embodiment, it is assumed that the contacts selected by the user have also consented to being monitored for likeness information about the user. However, in one embodiment, where a contact has not provided consent, a message might be sent to the contact requesting consent be provided. However, in another embodiment, where the contact has explicitly refused consent to monitoring for likeness, the contact's information might be grayed out—or otherwise so indicated that the contact is not selectable for determining user likeness.

In any event, processing moves next to block 404, where one or more other interfaces are provided such that other user selectable preferences are received for setting a configuration of the likeness application. For example, in one embodiment, information about a duration of time over which the data is to be used to determine the likeness percents may be received. Similarly, in another embodiment, settings may be received indicating that messages are or are not to be analyzed for POS recognition.

Processing then flows to decision block 406, where a determination is made whether the messaging application is active for the user. If so, processing proceeds to block 408; otherwise, processing flows to block 414.

At block 408, a messaging duration time may be collected. For a messaging application, such data may be determined based on how long a chat window is determined to be active for the user. Where the messaging application might be email, SMS, or some other application, where time might be more of a vague concept, then other metrics might be used, instead. For example, a number of messages sent between the users might be used, such as collected at block 410. However, in another embodiment, a message length might be used instead, or messages might be monitored to determine a frequency in which the messages are being sent between the users. Then, when there is a determined inactivity of messages between the users for a defined time period, then an estimate of time may be determined based on when the first message was sent, and a last message was sent. However, other mechanisms may also be used for email messages, or the like. Thus, as noted, at block 410, other messaging metrics, such as the count of a number of messages might be collected, or the like.

Proceeding next to block 412, in one embodiment, where consent has been provided by the parties concerned, content of the messages might also be analyzed to determine other likeness metrics. For example, using POS analysis, names of users might be determined with a message content. Similarly, where pronouns are used, such as "he, she, him, her," or the like, may be used in conjunction with a name to associate various sentences to being about the named person. Then, the sentences having such nouns, pronouns, or the like, may be analyzed to determine whether various adjectives, nouns, adverbs, or the like are used. In one embodiment, a dictionary might be used to assist in identifying use of such sentence elements. For example, for a sentence such as "John is really a cool guy," the term "really cool" might be detected and associated with John, where John might be the user about which the data is being collected. Such POS analysis may then be used to determine a likeness metric about the user.

Continuing, process 400 may then loop back to decision block 406 to determine whether the messaging session, or other communications are determined to no longer be active. If so, processing flows to block 414, where in likeness percents may be determined based at least in part on session time.

While various calculations may be performed, the following provides at least one embodiment of a possible implementation. Thus, in this non-exhaustive, non-limiting example, consider users A, B, and C. Likeness messaging monitoring is performed for messaging communications between A and B, A and C, and B and C, each of which having consented to such monitoring. Then, to determine a likeness percent for user A being liked by user B, a total amount of active session time user B spends chatting with all the users (A and C) in a defined time period is obtained—as X. A total time user B spends chatting with user A only in the same time period is also obtained—as Y. Then, the likeness percent based on time, indicating user B likes user A is 100*(Y/X). Similarly, a relative likeness percent user A is being liked by all the users on user A's contact list (B and C) may be determined based on:

the total time user B spends chatting with all the users on user B's contact list in the same time period—b;

the total time user C spends chatting with all users on user C's contact list in the same time period—c The total time user B spends chatting with user A only in the same time period—ba The total time user C spend chatting with user A only in the same time period—ca.

Using the above data, it is determined that Users B and C like User A by:

$$[(ba+ca)/(b+c)]*100.$$

In one embodiment, the time periods may each be determined to be based on a 24 hour scale, where results are generated at a defined time. For example, results may be uniformly based on being generated at 11:59:59 PM every night, once in a whole day. However, other times may also be used. Thus, the next day, if a user wants to see the likeness factor, they might see yesterday's results. That is, in one embodiment, a delay of a day might exist. However, other embodiments might include more immediate, substantially at real time calculations, to minimize, if not eliminate, any delays.

In another example, consider Alice conducts an active messaging session on Thursday, June 9, for 30 minutes with John. John, on the same day, participates in an active messaging session with Frank for 20 minutes. Then, the total chat time on Wednesday, June 9, calculated from 11:59 PM, between John and Alice is 30 minutes, between John and Frank as 20 minutes, and the time John spent chatting that day was 50 minutes.

Then, Alice's likeness percent with respect to John, displayed to her on Thursday would be (30/50)*100=60%. Similarly, If Frank wants to know his likeness factor with respect to John, on Thursday, it would be (20/50)*100=40%.

Additionally, if on Thursday, John spends 15 minutes and 25 minutes chatting with Alice and Frank, respectively, then the likeness percent for Alice by John is (15/40)*100=37.5%; and Frank by John is (25/40)*100=62.5%. If Alice wants to know for the two days, the likeness percent for her by John, it may be determined as f[30+15]/[50+40])*100=50%. Similarly, Franks' likeness percent for the two days by John would be 50%.

As noted, however, other time intervals may also be selected for calculating the likeness factors based on durations of active sessions between different users. Where active sessions include more than three users, the session durations may still be calculated. For example, for a 20 minute session between A, B, and C, the 20 minutes would be used to identify sessions between A and B, B and C, and A and C.

In any event, optionally (as indicated by the dashed boxes), the likeness percents may also be determined based additionally, or instead, using other metrics, at block 416. For example, as noted above, for email messages, SMS messages, or the like, a count of a number of messages during a given time period may be used. Thus, for example, where the user communicate using email and IM, independent ratios of counts and session times might be determined, and then combined to provide a single likeness percent between the communicating parties, such as discussed above for just session times.

Similarly, moving to block 418, messages may be analyzed for POS detection, such as described above. This data may then either be used to determine ratios of POS positive and/or negative. The positive comments may be combined with the negative comments to generate a single ratio based on the POS analysis. In one embodiment, the negative and positive comments may each have substantially equal weighting. However, in another embodiment, using a dictionary analysis, selected words might have higher positive or negative weighting. For example, "extremely cool," might be weighed higher positively, than, "cool." Negative words might have similar weighting systems applied. In one embodiment, such POS data might be displayed to the user to provide additional likeness feedback. However, in another embodiment, such data might not be separately displayed, where it might be determined to be highly negative. In one embodiment, the source of the POS data might not be displayed, to provide anonymity to the users.

Processing may then continue to block 420 where the likeness percents may be compared to an upper threshold to determine whether the user is 'highly liked.' If so, then various congratulatory messages might be selected for display to the user. Similarly, for likeness percents that are determined to below a lower threshold, then other suggestion messages, or the like, might be selected for display to the user. Any of a variety of threshold values may be selected for the upper and/or lower thresholds. For example, values between about 65-70 might be selected as the upper threshold value, while values between about 20-40 might be selected as the lower threshold values. In one embodiment, the threshold values might be dynamically computed based on the number of contacts over which the likeness values are be analyzed. For example, for a small number (between about 2-6 contacts) the thresholds could be reduced, say around 5-15 for the lower, and between about 51-6-for the upper thresholds. However, other values may also be selected.

Continuing to block 420, similarly, based on a comparison of upper and lower advertisement thresholds to the likeness percents, various advertisements might be selected for display to the user.

Processing then flows to decision block 424, where a determination is made whether to continue providing likeness percent data to the user. If so, processing loops back to block 402; otherwise, processing may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Non-Limiting, Non-Exhaustive Example User Interface

The following discusses several non-limiting, non-exhaustive examples of possible user interfaces that may be provided for display at a client device, such as those described above in conjunction with FIGS. 1-2. The interfaces illustrated in FIGS. 5-8 may include many more or less components than those shown. The components shown, however, are sufficient to disclose an illustrative embodiment for practicing the invention. Such interfaces may be provided, in one embodiment, by one or more of client devices 101-105 of FIG. 1, and/or one or more network devices useable as SLS 107's network device.

Figure 5:
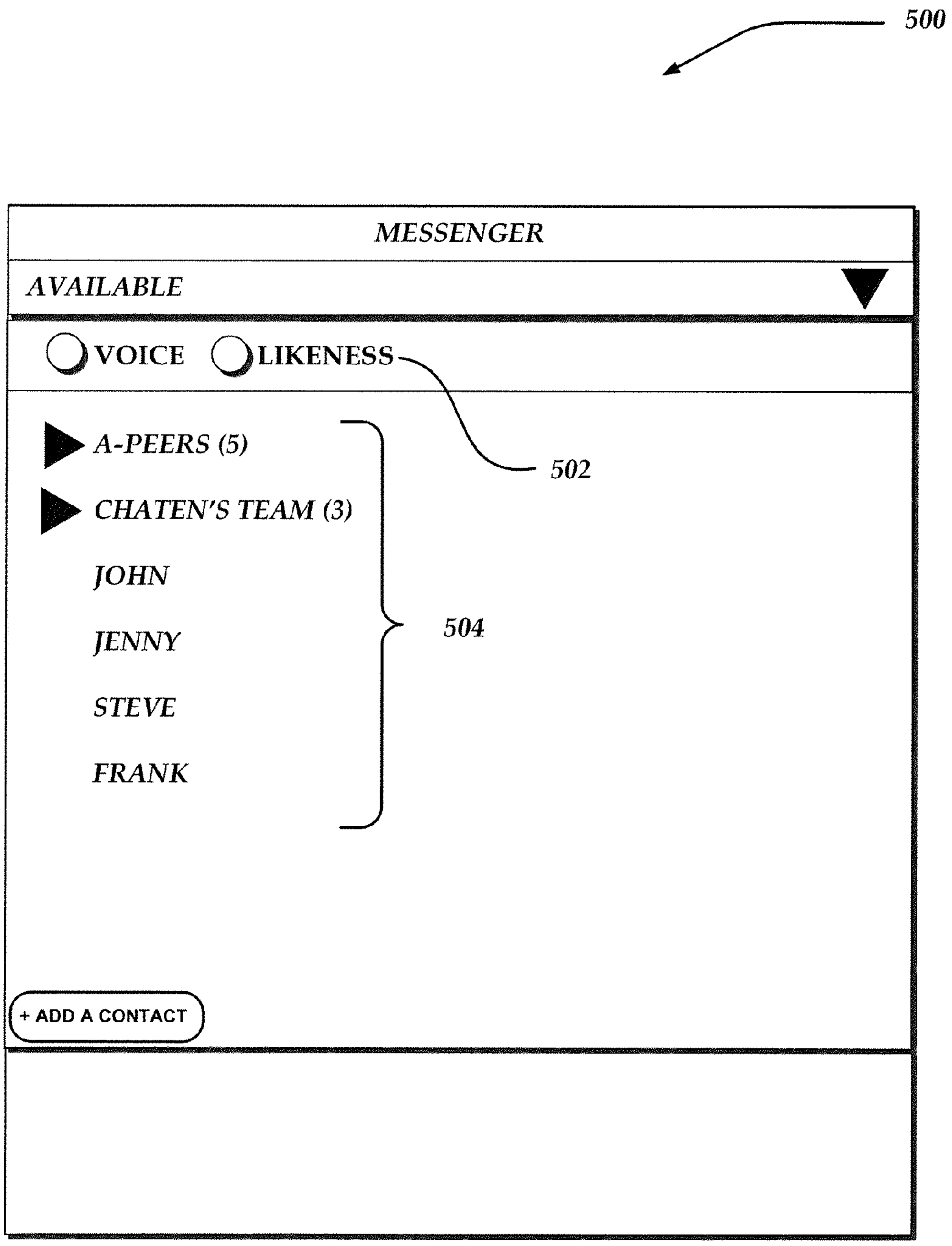
FIGS. 5-7 illustrate various embodiments of non-limiting, non-exhaustive examples of user interfaces useable for configuring a 'likeness' application.

FIG. 5 illustrates one embodiment of non-limiting, non-exhaustive example of a user interfaces for managing a 'likeness' application, such as discussed above in conjunction with FIG. 2 (LLM 246) and FIG. 3 (RLM 357). As shown, interface 500 of FIG. 5 shows that the likeness application may be accessed through a messenger's interface, such as an IM messenger, or other chat messenger's interface. For example, the likeness application might be accessed through an email client application, an SMS message client application, or any of a variety of other messenger interfaces. Further, although access to the likeness application is herein illustrated as integrated within user interface screens for a messenger application, in another embodiment, the likeness application may also be accessed outside of such interfaces. For example, in one embodiment, the likeness application might be accessed through an icon on a client device's desktop, within an application folder, within an operating system's toolbar interface, or the like.

As shown, in one embodiment, a likeness selection indicator 502 might be displayed within a toolbar of the messenger's interface display. However, the selection indicator 502 may also be located in other locations within the messenger's interface, and therefore, is not limited to merely within a toolbar. In any event, selection of the likeness selection indicator 502 is directed towards enabling a user to access various display screen interfaces useable to manage various user preference settings.

Figure 6:
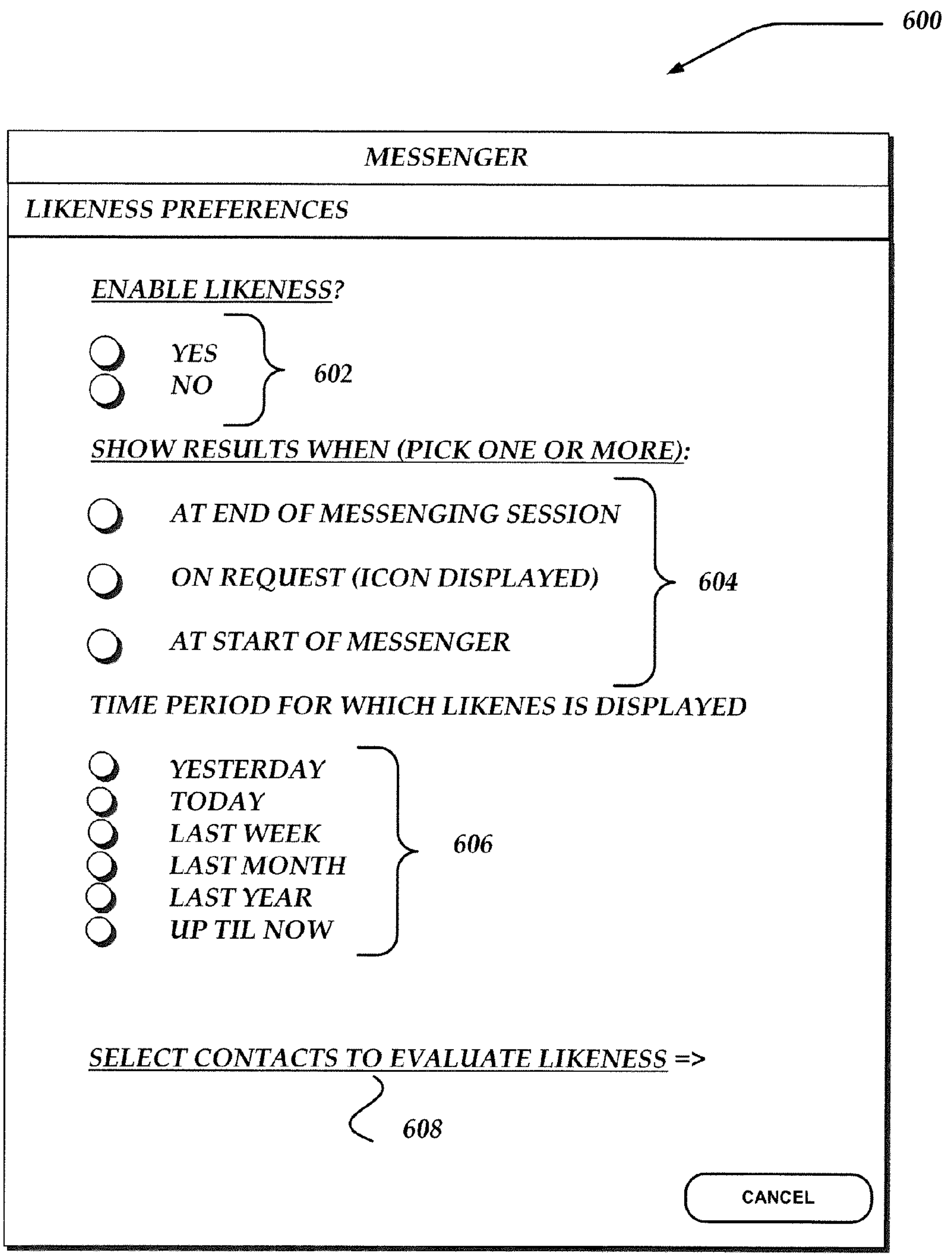

Thus, FIG. 6 illustrates one embodiment of non-limiting, non-exhaustive example of a user interfaces for managing user preferences to the 'likeness' application. As shown, interface 600 of FIG. 6 provides various selection indicators, including, but not limited to, enable icon 602 that enables a user to activate/deactivate the likeness application. Although not illustrated, a user may readily access a help link that is directed towards providing a user with details about the likeness application, and/or various selections, preferences, and the like. One embodiment of such a help link, might also be implemented using a 'floating question mark icon' that when moved over or in proximity to a selection icon, provides access to a floating help window about that selection icon. Other mechanisms may also be employed for accessing help, including, but not limited to help search, help indices, and the like. In one embodiment, the help information may further indicate various functions of the likeness application, along with what information might be employed from a user's profile, including, contact information, dates they were added to the user's contact lists, the contact's gender, or the like, as well as a time a user is spending chatting with others.

Display icon 604 provides shows one embodiment of options that may be provided to a user for selecting when likeness percent results might be displayed to the user, including, for example, at an end of a messaging session, upon request, or even when the user first starts the integrated messenger application. In one embodiment, such options might not be mutually exclusive. Thus, the user might be able to have the likeness results displayed under multiple conditions. In one embodiment, the user may be provided with time selection icon 606 for selecting a time period over which the likeness percents are to be calculated. Again, in one embodiment, such time selections might not be mutually exclusive. Thus, a user might wish to have displayed likeness percents for more than one time period. However, in another embodiment, such time selections may also be implemented as mutually exclusive, in the sense that the user might be constrained to selecting one time period.

As shown, the user might select time periods for yesterday (a full 24 hours); since last midnight until the current time (today), or the like. In one embodiment, each of the times may be computed from the identified time to and including a current time. Since the time the other selected contact has been on the user's contact list, the "up til now" icons might be enabled when one single contact is selected, however, in one embodiment, the "up til now" icon might be disabled.

In the case where multiple users frequency If last year is selected, but one of the users was added only 3 months ago, then in one embodiment, the calculations might be done on a basis on the period of the most recently added contact—e.g., the 3 months. Further, this information will be displayed to the requesting user. Similarly, for a single user, where the frequency of one week is selected, but the user was added just 3 days ago, then the likeness calculations might be done on a basis of just 3 days. Again, the requesting user would be provided with indication of how such calculations are obtained. In any event, in one embodiment, a default time might be selected, such as 'today,' or the like.

Figure 7:
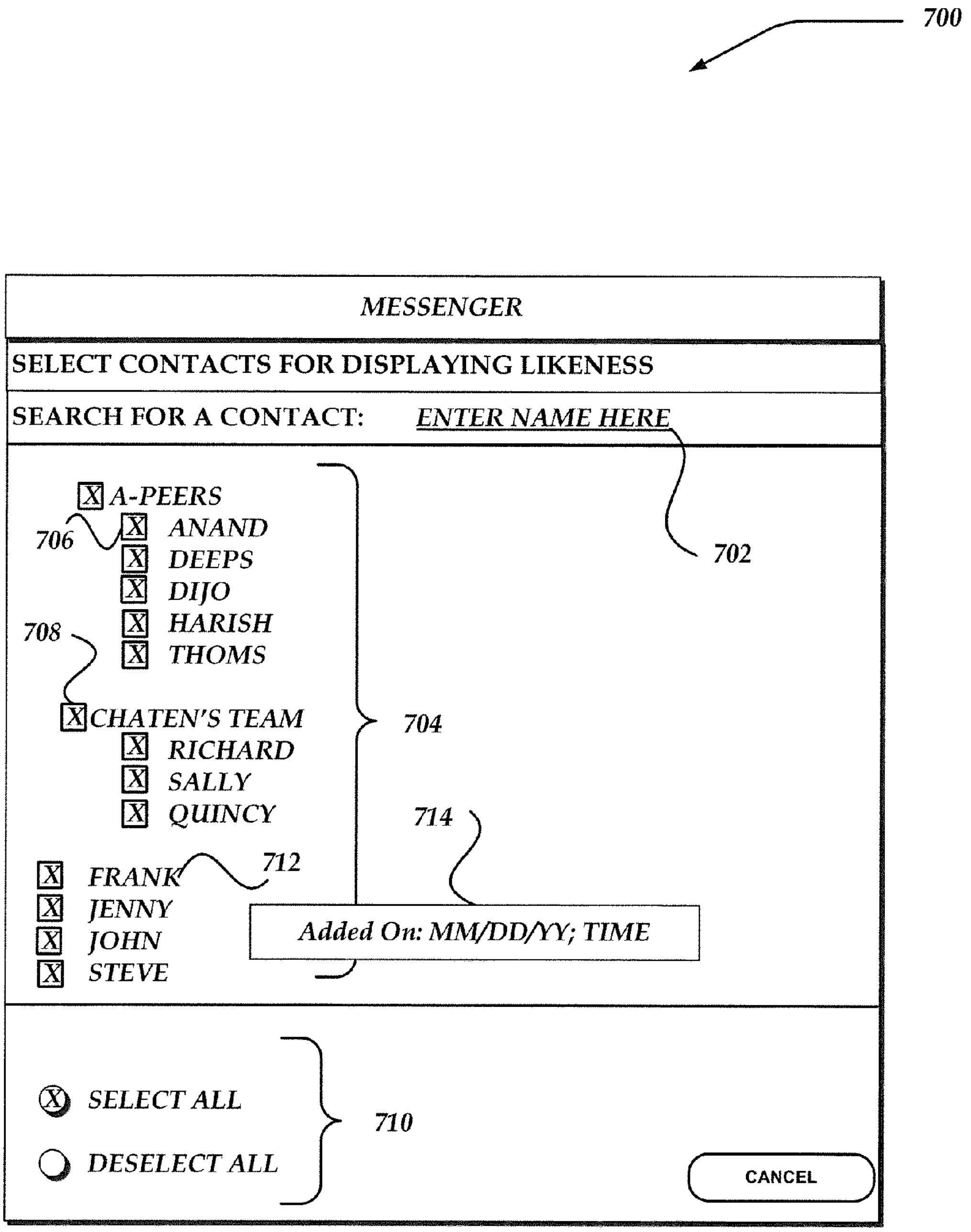

Interface 600 may further provide contact selection icon 608 that enables the user to select which contacts to display likeness percents. FIG. 7 provides one non-limiting, non-exhaustive embodiment of an example user preference interface for selecting contacts over for which likeness percent data may be obtained. As shown, interface 700 of FIG. 7 provides one possible interface for selecting the contacts. As shown, the contacts may be grouped into various groupings by the user, such as illustrated in grouping 708, or listed individually, such as individual 712. In one embodiment, if the contact has selected not to participate within such likeness collection activities, the contact name might be grayed out, or so indicated using any of a variety of other mechanisms. In one embodiment, contacts might also be provided with a mechanism that allows them to select to participate for messenger session time data collection, but, say for example, not for POS analysis data collection. Although not illustrated, such selections might be provided within a user preference interface screen, including added to any of those illustrated herein.

As is shown, a user might select an entire group using a group selection icon, 708, select individual contacts within a group, such as by using individual selection icon 706, and/or select individuals not associated with a user's indentified group, such as through icon 712. In one embodiment, the user is further provided a selection icon 710 that enables the user to select/deselect all contacts in the user's contact list. As noted above, in one embodiment, the list of contacts displayed within interface 700 may be specific a messenger application, or may be, in another embodiment, a integrated display of a variety of different messenger applications' contact lists, buddy lists, address books, and the like.

As is further illustrated, in one embodiment, the user may also be provided with a contact search capability 702 that enables a user to enter a name, portion of a name, or the like, and search for one or more contacts to be selected.

Moreover, also shown, as a contact is selected, in one embodiment, a display 714 may be provided that indicated when the contact was added for collecting likeness data. In one embodiment, the data might indicate a date and time when the contact was added. However, in another embodiment, the display 714 may also indicate, or instead indicate, how much time has elapsed since the contact was selected. This display 714 is directed towards enabling the user to decide on what time periods over which to display a likeness percent as illustrated in FIG. 6.

Figure 8:
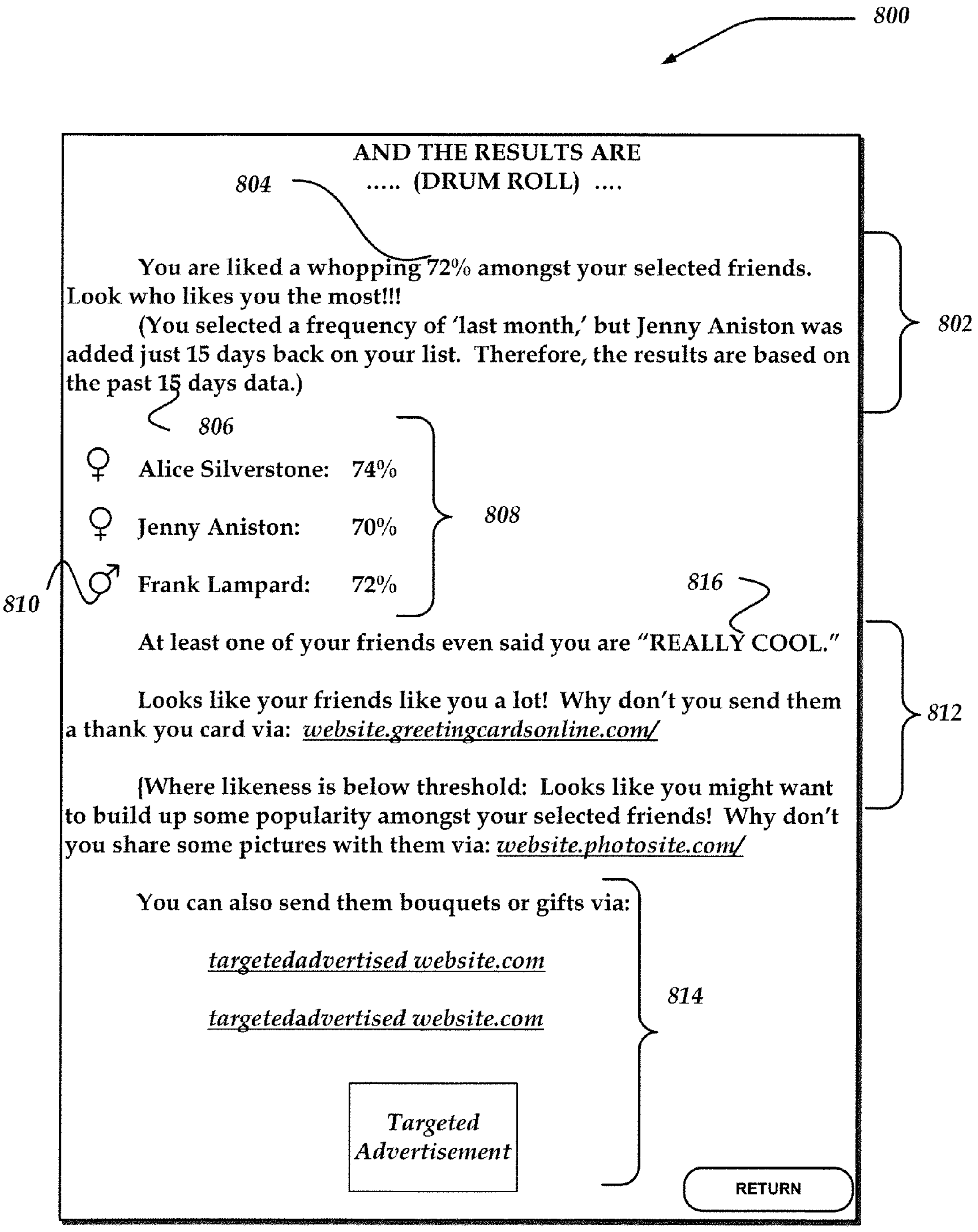
FIG. 8 illustrates a non-limiting, non-exhaustive example of one embodiment of a user interface useable for displaying to the user determined 'likeness' values for the user by one or more other users.

FIG. 8 illustrates a non-limiting, non-exhaustive example of a user interface useable for displaying to the user determined 'likeness' percents, and the like, for the user by one or more selected contacts. As shown, interface 800 provides a total calculated likeness percent 804 for all selected contacts, as discussed above. Further, information may be provided that indicates that a selected contact limited the duration over which the calculations were performed (time limiter 806). Thus, the user is provided with a fun and informative set of information 802 that indicates a level of likeness for the user. In one embodiment, such calculations may be based solely on the session times, as discussed above. However, in another embodiment, additional optional factors such as a count of messages, POS analysis or the like might be used to provide the likeness percents displayed within interface 800.

In one embodiment, for selected contacts, the user might be provided with individual likeness percents 808 indicating how much an individual contact might 'like' the user. In one embodiment, where the user selected a group of contacts, in one embodiment, group likeness percents might also be displayed, or displayed instead of individual contacts (where the individual contacts are members of the selected group).

As noted above, where contacts have provided permission, and the user so selects, POS results 816 might optionally be provided. In one embodiment, filtering might be performed to remove possible inflammatory comments, or other possible hurtful comments. In one embodiment, such data might be shown for positive comments, and not for any negative comments. However, the invention is not so limited. Moreover, in one embodiment, a source of the comment might be hidden, including, in such a manner that if the user attempts to deduce which of the contacts provided the comment, by selecting certain contacts for display on interface 800, the POS results 816 might be completely hidden, or the like.

Interface 800 may further illustrate various suggestions, advertisements, and the like, based on comparing likeness percents to an upper threshold and/or a lower threshold. For example, where the user's likeness percents are above the upper threshold, various congratulatory messages 812 might be displayed, including suggestions on how to show appreciation, via selected advertisements, or the like. Similarly, for likeness percents below the lower threshold, suggestions on how to improve the likeness percents, along with selected targeted advertisements 814 might be displayed. Such threshold comparisons and subsequent displays of comments, suggestions, advertisements, and the like, may be based on the total likeness percent 804, and/or one or more individual (or group) likeness percents 808.

Again, it should be noted that interface 800 may be displayed to the user upon termination of a messaging session, upon start up or the messaging application, or based on a variety of other criteria.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:

a transceiver to send and receive data over a network; and a processor that is operative on the received data to perform actions, including:

receiving a selection of a plurality of contacts;

monitoring durations of active messaging sessions between each of the plurality of contacts and further between one or more of the plurality of contacts and a user over at least one defined time period;

calculating likeness values based at least on the each of the monitored active messaging sessions, wherein the calculating of the likeness values for each one of the plurality of contacts is based on a duration of time the user spends in active messaging sessions with the one contact over a total duration of time the one contact spends in active messaging sessions with the plurality of contacts; and displaying, to the user, calculated likeness values including a total likeness value over the plurality of contacts for the user, and at least one likeness value indicating how much one of the plurality of contacts likes the user, wherein the total likeness value is determined based on a sum of total duration of time each of the plurality of contacts spend in active messaging sessions with the user over a sum of total duration of time each of the plurality of contacts spend in active messaging sessions inclusive of time spent with contacts other than the user.

2. The network device of claim 1, wherein the actions further include:

evaluating each of the selected plurality of contacts to identify whether at least one contact in the plurality is selected within a time period that is less than the defined time period; and if at least one contact is so identified, then performing each of the calculations for likeness values limited to the shorter time period.

3. The network device of claim 1, wherein the actions further include:

comparing the total likeness value to an upper threshold, and if the total likeness value exceeds the upper threshold selecting at least one of a congratulatory message and an advertisement for display to the user; and comparing the total likeness value to a lower threshold, and if the total likeness value is less than the lower threshold selecting at least one of a suggestion message for improving the likeness value and another advertisement for display to the user.

4. The network device of claim 1, wherein the actions further include:

providing the user with one or more interface display screens useable to enable the user to select various user preferences, including, when to display the likeness values, selecting the defined time period, and the plurality of contacts.

5. The network device of claim 1, wherein the actions further include:

displaying to the user a contact list for selecting the plurality of contacts, wherein at least one contact in the list is identified as not providing permission for monitoring.

6. A system, comprising:

one or more client devices; and a network device comprising a processor and configured to communicate with the one or more client devices over a network, and to perform actions, including:

receiving, by the network device from a first client device in the one or more client devices, a selection of a plurality of contacts for which to monitor message communications;

monitoring, by the network device, the message communications between each of the plurality of contacts and further between one or more of the plurality of contacts and a user of the first client device over a defined time period, wherein the monitoring of the message communications further comprises monitoring durations of active messaging sessions between the each of the plurality of contacts and further between the one or more of the plurality of contacts and the user of the first client device over the defined time period;

determining, by the network device, likeness values for each of the monitored message communications indicating how much each of the plurality of contacts like the user, and further a total likeness value indicating how much all of the plurality of contacts collectively like the user, wherein the determining of the likeness values for each one of the plurality of contacts is based on a duration of time the user spends in active messaging sessions with the one contact over a total duration of time the one contact spends in active messaging sessions with the plurality of contacts;

determining a total likeness value indicating how much all of the plurality of contacts collectively like the user, wherein the total likeness value is determined based on a sum of total duration of time each of the plurality of contacts spend in message communications with the user over a sum of total duration of time each of the plurality of contacts spend in message communications inclusive of time spent with contacts other than the user;

communicating, by the network device, the determined likeness values and the total likeness value to the first client device for display.

7. The system of claim 6, wherein the monitored message communications include at least one of an instant messaging communication, an email communications, or an Short Message Service communications.

8. The system of claim 6, wherein the network device performs actions further comprising:

determining that at least one contact in the plurality of contacts is selected within a time period that is less than the defined time period; and if at least one contact is so identified, then performing each of the calculations for likeness values limited to the shorter time period.

9. The system of claim 6, wherein the network device performs actions further comprising:

comparing at least one likeness value to an upper threshold, and if the at least one likeness value exceeds the upper threshold selecting at least one of a congratulatory message and an advertisement for display to the user; and comparing the at least one likeness value to a lower threshold, and if the at least one likeness value is less than the lower threshold selecting at least one of a suggestion message for improving the likeness value and another advertisement for display to the user.

10. The system of claim 6, wherein the network device performs actions further comprising, selectively displaying at least one positive comment to the user.

11. A non-transitory computer-readable storage medium having computer-executable instructions, the computer-executable instructions when installed onto a computing device enable the computing device to perform actions, comprising:

receiving a selection of a plurality of contacts for which to monitor message communications;

monitoring the message communications between each of the plurality of contacts and further between one or more of the plurality of contacts and a user of the client device over a defined time period, wherein the monitoring of the message communications further comprises monitoring durations of active messaging sessions between the each of the plurality of contacts and further between the one or more of the plurality of contacts and the user of the client device over the defined time period;

determining likeness values for each of the monitored message communications indicating how much each of the plurality of contacts like the user, wherein the determining of the likeness values for each one of the plurality of contacts is based on a duration of time the user spends in active messaging sessions with the one contact over a total duration of time the one contact spends in active messaging sessions with the plurality of contacts, determining a total likeness value indicating how much all of the plurality of contacts collectively like the user, wherein the total likeness value is determined based on a sum of total duration each of the plurality of contacts spend in active messaging sessions with the user over a sum of total duration of time each the plurality of contacts spend in active messaging sessions inclusive of time spent with contacts other than the user; and displaying the determined likeness values and the total likeness value to the client device.

12. The non-transitory computer-readable storage medium of claim 11, wherein the monitored message communications include at least one of an instant messaging communication, an email communications, or a Short Message Service communications.

13. The non-transitory computer-readable storage medium device of claim 11, wherein the actions further comprise:

determining that at least one contact in the plurality of contacts is selected within a time period that is less than the defined time period; and if at least one contact is so identified, then performing each of the calculations for likeness values limited to the shorter time period.

14. The non-transitory computer-readable storage medium of claim 11, wherein the actions further comprise:

comparing at least one likeness value to an upper threshold, and if the at least one likeness value exceeds the upper threshold selecting at least one of a congratulatory message or an advertisement for display to the user; and comparing the at least one likeness value to a lower threshold, and if the at least one likeness value is less than the lower threshold selecting at least one of a suggestion message for improving the likeness value or another advertisement for display to the user.

* * * * *